United States Patent
Li

(10) Patent No.: US 12,353,064 B2
(45) Date of Patent: Jul. 8, 2025

(54) VARIABLE TINT LENS AND EYEGLASSES USING THE SAME

(71) Applicant: Shenzhen Wicue Optoelectronics Co., Ltd., Guangdong (CN)

(72) Inventor: Fenghua Li, Guangdong (CN)

(73) Assignee: SHENZHEN WICUE OPTOELECTRONICS CO. LTD., Shenzhen (CN)

( * ) Notice: Subject to any disclaimer, the term of this patent is extended or adjusted under 35 U.S.C. 154(b) by 408 days.

(21) Appl. No.: 17/879,848

(22) Filed: Aug. 3, 2022

(65) Prior Publication Data
US 2024/0045117 A1 Feb. 8, 2024

(30) Foreign Application Priority Data
Jun. 7, 2021 (CN) .......................... 202121260450.6

(51) Int. Cl.
*G02C 7/02* (2006.01)
*G02B 3/12* (2006.01)

(52) U.S. Cl.
CPC ................ *G02C 7/02* (2013.01); *G02B 3/12* (2013.01)

(58) Field of Classification Search
CPC ........ C09K 19/00; C09K 19/02; C09K 19/04; C09K 19/52; C09K 2323/03; C09K 19/544; C09K 19/60; C09K 2323/00; G02B 5/30; G02B 5/3008; G02B 5/3016; G02B 5/3083; G02B 27/144; G02B 27/149; G02B 27/1046; G02B 26/02; G02B 5/3058; G02B 27/281; G02B 27/142; G02B 13/0075; G02B 27/017; G02B 3/12; G02B 26/007; G09G 3/36; G09G 3/3648; G09G 3/3696; B32B 17/10504; B32B 17/10036; B32B 17/10495; B32B 17/10761; B32B 7/023; G02C 7/02; G02C 7/101
See application file for complete search history.

(56) References Cited

U.S. PATENT DOCUMENTS

| | | | |
|---|---|---|---|
| 2013/0258266 A1* | 10/2013 | Sukhomlinova | C09K 19/601 252/299.01 |
| 2015/0022776 A1* | 1/2015 | Chen | G02C 7/101 351/159.61 |
| 2015/0192828 A1* | 7/2015 | Zhong | C09K 19/60 349/46 |

(Continued)

*Primary Examiner* — Darryl J Collins
*Assistant Examiner* — Matthew Y Lee
(74) *Attorney, Agent, or Firm* — PV IP PC; Wei Te Chung

(57) ABSTRACT

The present invention discloses a variable tint lens and eyeglasses using the lens, wherein the variable tint lens includes a tint varying film including transparent first and second substrate layers, a liquid crystal layer, and a power supply device for supplying power to each layer of the tint varying film; a dichroic dye molecule layer is provided on a surface of liquid crystal molecules of the liquid crystal layer, and a direction in which the liquid crystal molecules are aligned in each layer of the tint varying film is adjustable with a voltage provided by the power supply device. The whole lens can adjust swiftly and features a fast response; the adjustable range is large because of the simple structure and high transmittance. Moreover, it can also enable multi-tint adjustment when a multi-layer tint varying film is used for the lens; it can also adapt to various environments.

14 Claims, 5 Drawing Sheets

(56) References Cited

U.S. PATENT DOCUMENTS

| | | | | |
|---|---|---|---|---|
| 2016/0085108 A1* | 3/2016 | Junge | ............... | G02F 1/13475 |
| | | | | 349/123 |
| 2018/0177232 A1* | 6/2018 | Ding | ............... | H05B 1/0227 |
| 2018/0321529 A1* | 11/2018 | Osterman | ........... | G02F 1/13475 |
| 2019/0146134 A1* | 5/2019 | Miura | ............... | G02F 1/0316 |
| | | | | 349/84 |
| 2020/0018962 A1* | 1/2020 | Lu | ............... | G02B 27/0172 |
| 2020/0183204 A1* | 6/2020 | Yoshida | ............ | C09K 19/544 |
| 2022/0137703 A1* | 5/2022 | Miller | ............. | G06T 7/73 |
| | | | | 345/633 |
| 2024/0157682 A1* | 5/2024 | Ma | ............ | C03C 17/42 |

\* cited by examiner

VARIABLE TINT LENS AND EYEGLASSES USING THE SAME

CROSS REFERENCE TO RELATED APPLICATIONS

The present application claims the benefit of Chinese Patent Application No. 202121260450.6 filed on Jun. 7, 2021, the contents of which are incorporated herein by reference in their entirety.

TECHNICAL FIELD

The present invention relates to the technical field of eyeglasses, more particularly, to a variable tint lens and eyeglasses using the same.

BACKGROUND ART

Conventional dimmable eyeglasses include two types. One type is photochromic because of the chemical effect of silver halide, and such dimmable eyeglasses automatically darken when exposed to ultraviolet rays outdoors and return to a transparent state indoors or at a place without ultraviolet rays. However, such dimmable eyeglasses are disadvantageous for a low response, failing to meet the demand for fast light transmittance switching of dimmable eyeglasses. The other type adopts the form of TN (Twisted Nematic) liquid crystal glass in conjunction with a polarizer and voltage, but such dimmable eyeglasses are not so desirable for lower light transmittance because of the configuration of the polarizer. Such dimmable eyeglasses have a transmittance of 0.5% in a dark state, and 36% in a transparent state; the viewing angle is narrow, and there is an obvious boundary line of field of view (dark line). Moreover, non-toughened ITO glass is commonly used in such eyeglasses, which is potentially defective in terms of safety.

SUMMARY OF THE INVENTION

It is an object of the present invention to address the inconvenience of changing the tint of an eyeglass lens in the prior art by providing a variable tint lens and eyeglasses using the same.

The technical solution adopted by the present invention is a variable tint lens, including:
  at least one layer of a tint varying film, including transparent first and second substrate layers, a liquid crystal layer being provided between the first substrate layer and the second substrate layer;
  a power supply device for supplying power to each layer of the tint varying film; and
  a dichroic dye molecule layer provided on a surface of liquid crystal molecules of the liquid crystal layer, a direction in which the liquid crystal molecules are aligned in each layer of the tint varying film being adjustable with a voltage provided by the power supply device.

Preferably, a plurality of the tint varying films has at least one layer of the tint varying film that has a dichroic dye molecule layer in a different tint from the dichroic dye molecule layer of other tint varying films.

Preferably, a lamination of the tint varying films has at least three layers, of which at least one layer of the tint varying film has a red dichroic dye molecule layer, at least one layer of the tint varying film has a green dichroic dye molecule layer, and at least one layer of the tint varying film has a blue dichroic dye molecule layer.

Preferably, the first substrate layer includes a first flexible substrate, a first conductive film layer and a first alignment layer which are laminated, the second substrate layer includes a second flexible substrate, a second conductive film layer and a second alignment layer which are laminated, the power supply device is electrically connected to the first conductive film layer and the second conductive film layer, and the liquid crystal layer is sandwiched between the first alignment layer and the second alignment layer.

Preferably, a polarizer/reflector is provided on a side of the first flexible substrate and/or the second flexible substrate away from the liquid crystal layer.

Preferably, directions in which the first alignment layer and the second alignment layer in each layer of the tint varying film align the liquid crystal molecules in the liquid crystal layer, respectively, are parallel and opposite, and directions in which the alignment layers of two adjacent layers of the tint varying film align the liquid crystal molecules in a respective liquid crystal layer are perpendicular.

Preferably, the tint varying film is divided into a plurality of tint regions, the dichroic dye molecule layer shows identical or different tints corresponding to the plurality of tint regions, and the power supply device supplies power to each tint region separately.

Preferably, the power supply device is an infrared power supply device.

Preferably, the power supply device includes a solar cell and a drive module for converting a direct current to an alternating current, the solar cell is electrically connected to the drive module, the lens is provided with an electrode, and the drive module is electrically connected to the electrode.

Preferably, the power supply device is a wired/wireless rechargeable battery.

Preferably, materials of the first conductive film layer and the second conductive film layer are both ITO.

Preferably, materials of the first alignment layer and the second alignment layer are both PI.

Preferably, a material of the first flexible substrate and the second flexible substrate is one of PI, PC, PET, COP, COC, and TAC.

Preferably, the lamination of the tint varying films has three layers, and the dichroic dye molecule layers of the three layers of the tint varying films are red, green, and blue, respectively.

The present invention further provides eyeglasses including a frame and a lens, wherein the lens is the variable tint lens as described above.

Preferably, the Lens Includes:
  at least one layer of a tint varying film, including transparent first and second substrate layers, a liquid crystal layer being provided between the first substrate layer and the second substrate layer;
  a power supply device for supplying power to each layer of the tint varying film; and
  a dichroic dye molecule layer provided on a surface of liquid crystal molecules of the liquid crystal layer, a direction in which the liquid crystal molecules are aligned in each layer of the tint varying film being adjustable with a voltage provided by the power supply device.

Preferably, the power supply device is provided with a power-off button, a voltage-up button, and a voltage-down button.

The present invention is more advantageous than the prior art in that:
1. because of the guest-host effect between the dye molecule layer and the liquid crystal layer, the dye molecule layer shows different transmittance at different voltages, and the whole lens can adjust swiftly and features a fast response, which is as quick as 0.1 s; the adjustable range is large (1% to 80%) because of the simple structure and high transmittance;
2. various tints can be selected for the dye molecule layer, and it can also enable multi-tint adjustment when a multi-layer tint varying film is used for the lens, which is more dazzling; it can also adapt to various environments, which renders broader application of the product along with improved enjoyment of users;
3. since the tint varying film is divided into a plurality of separate tint regions, and the power supply device supplies power to each region separately, hence the change of the tint and tint depth in each region is distinct, which not only diversifies the form of the change of the lens, but also enables the display of particular shapes or logos, even text and patterns, as per specific requirements;
4. the power supply device can adopt various forms according to the requirements of different use environments to fit various adjustment models such as manual adjustment or automatic adjustment, and it is installed inside the frame of the eyeglasses, with negligible effect on the design of the whole eyeglasses;
5. the lens adopts a flexible substrate and can be bent into a desirable shape, which reduces the potential safety hazard of shattering and injuring people.

BRIEF DESCRIPTION OF THE DRAWINGS

The present invention will be described in detail with reference to the following embodiments and the accompanying drawings, in which:

FIG. 2 is a schematic structural diagram of a tint varying film in Embodiment 1 when not powered on;

FIG. 3 is a schematic structural diagram of the tint varying film in Embodiment 1 when powered on;

Figure 1:
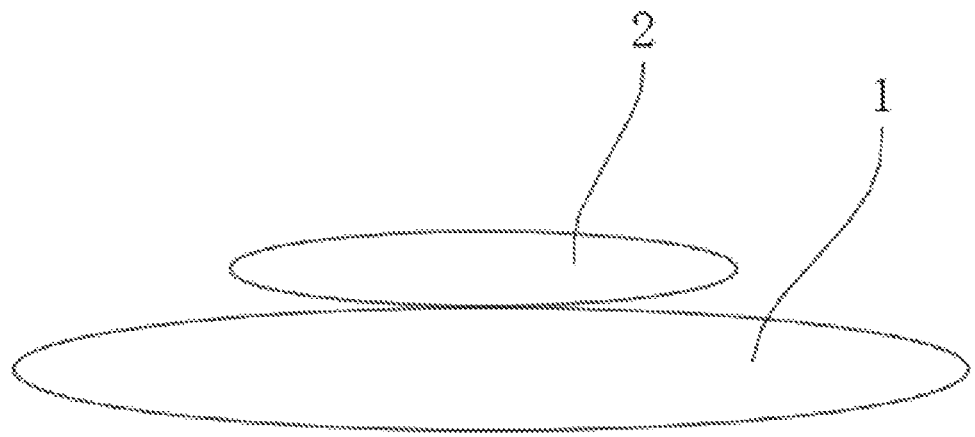
FIG. 1 is a schematic diagram of a liquid crystal molecule and a dye molecule in the present invention.

1. liquid crystal molecules; 2. dye molecule; 3. first substrate layer; 31. first flexible substrate; 32. first conductive film layer; 33. first alignment layer; 34. liquid crystal layer; 4. second substrate layer; 41. second flexible substrate; 42. second alignment layer; 43. second conductive film layer; 5. third substrate layer; 51. third flexible substrate; 52. third conductive film layer; 53. third alignment layer; 6. fourth substrate layer; 61. fourth conductive layer; 62. fourth alignment layer; 63. fourth flexible substrate; 7. second liquid crystal layer; 8. frame; 13. reflector; 14. polarizer; 15. power supply device.

DETAILED DESCRIPTION OF THE INVENTION

In order that the technical problems to be solved, technical solutions and advantageous effects of the present invention become clearer, the present invention is described in further detail below with reference to the drawings and embodiments. It should be understood that the specific embodiments described herein are merely illustrative of the present invention and are not intended to limit the same.

In the description of the present invention, it is to be understood that the terms "center", "length", "width", "thickness", "upper", "lower", "front", "rear", "left", "right", "vertical", "horizontal", "top", "bottom", "inner", "outer" and the like indicate orientations or positional relationships based on the orientations or positional relationships shown in the drawings, merely for convenience in describing the present invention and to simplify the description, and do not indicate or imply that the indicated devices or elements must have a particular orientation or be constructed and operated in a particular orientation. Therefore, it is not to be construed as limiting the present invention.

In the description of the present invention, it should be noted that, unless expressly specified and defined otherwise, terms like "mounted", "coupled" and "connected" are to be interpreted broadly. For example, the connection may be a fixed, detachable, or integral connection; the connection may be a mechanical connection or an electrical connection; the connection may be a direct connection or an indirect connection through an intermediate medium, and the connection can be internal communication of two elements or the interaction between the two elements. For a person of ordinary skill in the art, the specific meaning of the above-mentioned terms in the present invention can be understood according to specific situations.

The principle and structure of the invention will be described in detail with reference to the drawings and embodiments.

A variable tint lens, including:
    at least one layer of a tint varying film, including transparent first and second substrate layers, a liquid crystal layer being provided between the first substrate layer and the second substrate layer;
    a power supply device for supplying power to each layer of the tint varying film; and
    a dichroic dye molecule layer provided on a surface of liquid crystal molecules of the liquid crystal layer, a direction in which the liquid crystal molecules are aligned in each layer of the tint varying film being adjustable with a voltage provided by the power supply device.

The liquid crystal layer may adopt positive or negative liquid crystals, and the dichroic dye molecule layer on the surface of the liquid crystal layer may follow the liquid crystal layer due to a guest-host effect. The liquid crystal molecules themselves do not have a dimming effect, but the dye molecules can. The dye molecules are similar in shape to the liquid crystal molecules, like pieces of rice; there are a major axis along which light passes and a minor axis along which light is absorbed. The movement of liquid crystal molecules affects the running of the dye molecules, and the dimming effect is achieved.

In the guest-host effect liquid crystal technology, the liquid crystal is the host, and the dichroic dye is the guest;

the dichroic dye molecule layer is attached to the surface of the liquid crystal molecules, and the dichroic dye molecules are aligned in the same direction as the liquid crystal molecules; the polarized light parallel to the major axis of the liquid crystal molecules can be absorbed, and only a small amount of the polarized light perpendicular to the major axis of the liquid crystal molecules can be absorbed. Therefore, when the liquid crystal molecules are arranged in parallel (or in a planar spiral), the dichroic dye molecules absorb light and are then in a dark state, typically reaching a dark state with a light transmittance of 10%; when the liquid crystal molecules are perpendicularly arranged, the dichroic dye molecules absorb only a small amount of light and are then in a transparent state, typically reaching a transparent state with a light transmittance of 80%. In this embodiment, a small amount of a chiral agent can be added to the liquid crystal layer so that when the liquid crystal molecules turn into a planar state at a voltage, the liquid crystal molecules revolve to form a spiral structure, which is beneficial to enhance the light absorption effect in the dark state.

When the power supply device provides an alternating current for the tint varying film layer, the liquid crystal molecules will be driven to turn into a planar or inclined state; a greater voltage from the power supply device causes a better planar state of the liquid crystal molecules, and then leads to an enhanced performance of the dichroic dye molecule layer to absorb light and a darker tint of the lens, thereby achieving continuous adjustment of the light transmittance; if different tints are selected for the dichroic dye molecule layer, continuous adjustment of the tint depth of a single tint is achievable when adjusting the lens.

In particular, the first substrate layer of each layer of the tint varying film includes a first flexible substrate, a first conductive film layer, and a first alignment layer which are laminated; the second substrate layer includes a second flexible substrate, a second alignment layer and a second conductive film layer which are laminated. The power supply device is electrically connected to the first conductive film layer and the second conductive film layer, and the liquid crystal layer is sandwiched between the first alignment layer and the second alignment layer.

Materials of the first conductive film layer and the second conductive film layer are both ITO, materials of the first alignment layer and the second alignment layer are both PI, and a material of the first flexible substrate and the second flexible substrate is one of PI, PC, PET, COP, COC, and TAC. Taking these materials to manufacture the lens, the producer may obtain a product with little haze, i.e., only about 1%, and good enough clarity to meet user requirements. Moreover, the voltage-driven control of liquid crystal to revolve and then change the distribution of the dichroic dye molecule layer features a fast response, as fast as 0.1 s, which can quickly adapt to various environments.

In addition, there are also various options for the power supply device, such as an infrared power supply device; alternatively, the power supply device includes a solar cell and a drive module for converting a direct current into an alternating current, wherein the solar cell is electrically connected to the drive module, an electrode is provided on the lens, and the drive module is electrically connected to the electrode; alternatively, the power supply device is a wired/wireless rechargeable battery.

Figure 2:
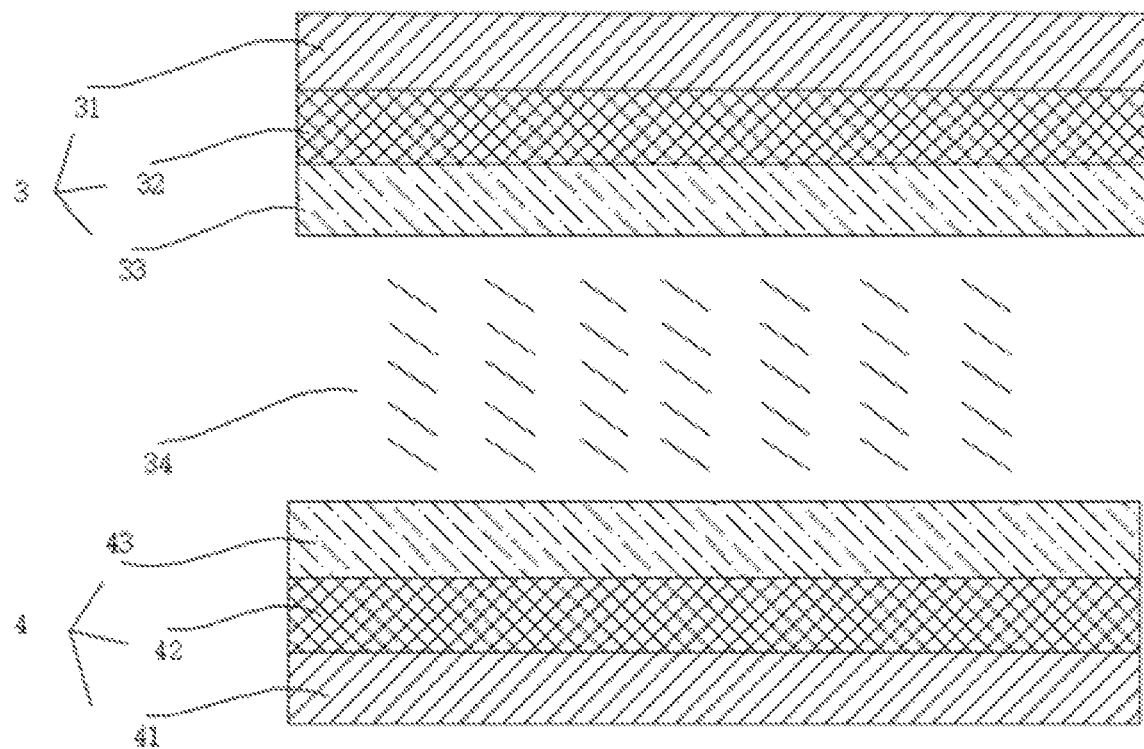
Figure 3:
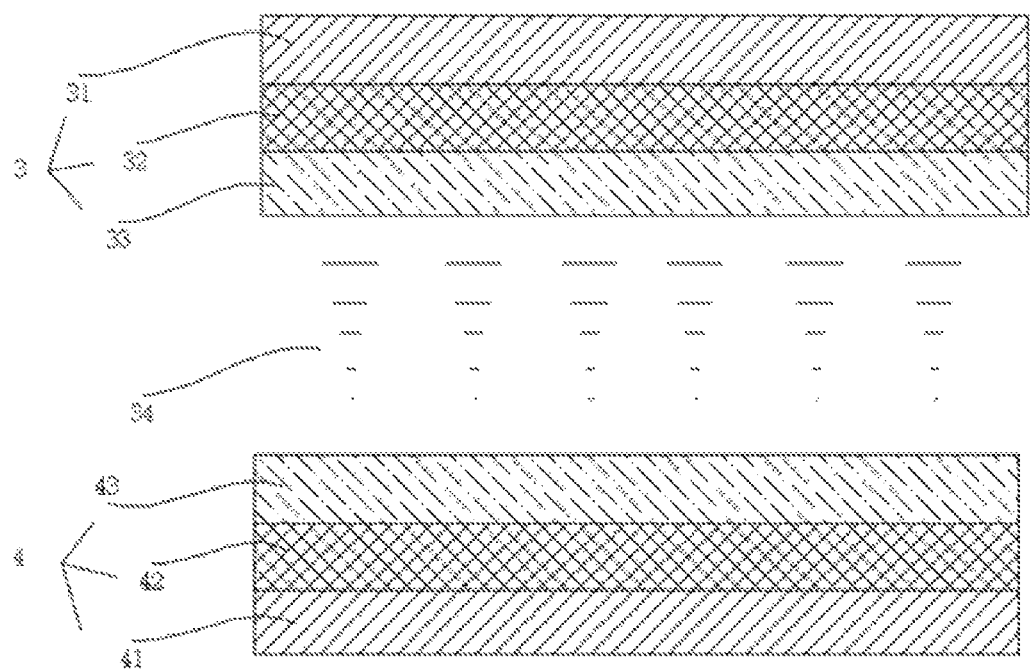

In Embodiment 1, a variable tint lens is shown in FIGS. 1 to 3 and includes a layer of the tint varying film and a power supply device 15, wherein the tint varying film includes a first flexible substrate 31, a first conductive film layer 32, a first alignment layer 33, a liquid crystal layer 34, a second alignment layer 42, a second conductive film layer 43, and a second flexible substrate 41 which are successively laminated, and the dichroic dye molecule layer is provided on the liquid crystal layer 34.

The materials of the first flexible substrate 31 and the second flexible substrate 41 are PI, the materials of the first conductive film layer 32 and the second conductive film layer 43 are both ITO, and the materials of the first alignment layer 33 and the second alignment layer 42 are both PI.

The power supply device is one of an infrared power supply device 15, a solar power supply device 15, and a USB rechargeable battery, and electrically connected to the first conductive film layer 32 and the second conductive film layer 43, respectively; when turned on, the power supply device can power on the first conductive film layer 32 and the second conductive film layer 43 to form an electrode, thereby affecting the liquid crystal layer 34 to achieve the effect of changing the distribution of the dichroic dye molecule layer and change the light transmittance of the lens. Specifically, when powered on, the liquid crystal layer 34 has a planar spiral arrangement, and the dichroic dye molecules absorb light and are in a dark state; when not powered on, the liquid crystal molecules 1 of the liquid crystal layer 34 are in a perpendicular arrangement, the dichroic dye molecules absorb only a small amount of light and are in a transparent state. The transmittance is between 10% and 50%.

In this embodiment, the dichroic dye molecule layer may be tintless, as such, the adjustment targets directly the light transmittance of the lens as a whole, i.e., the change between bright and dark states, which is adaptive to both highlight and normal environments and facilitates switching between them. The dichroic dye molecule layer can also be a monochromatic dye, for example, in purple, orange, blue, green, or red, hence the tint depth is adjustable when the lens is adjusted, which is also applicable to different environments and satisfy the needs of different consumers.

Figure 4:
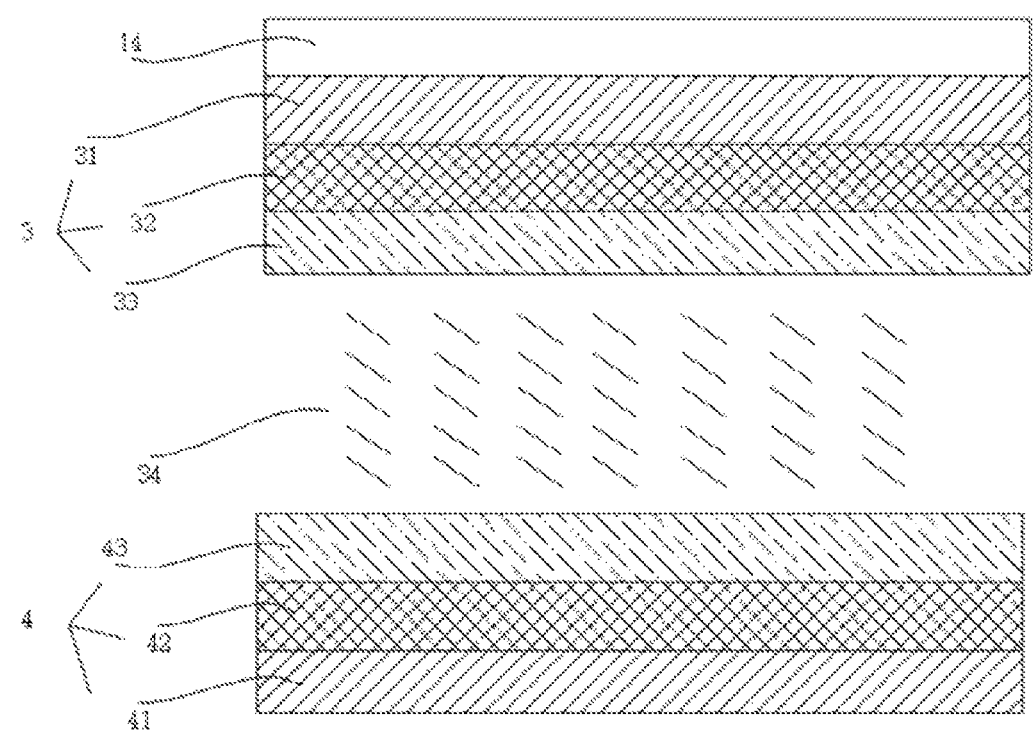
FIG. 4 is a schematic structural diagram of the tint varying film provided with a polarizer in Embodiment 2.
Figure 5:
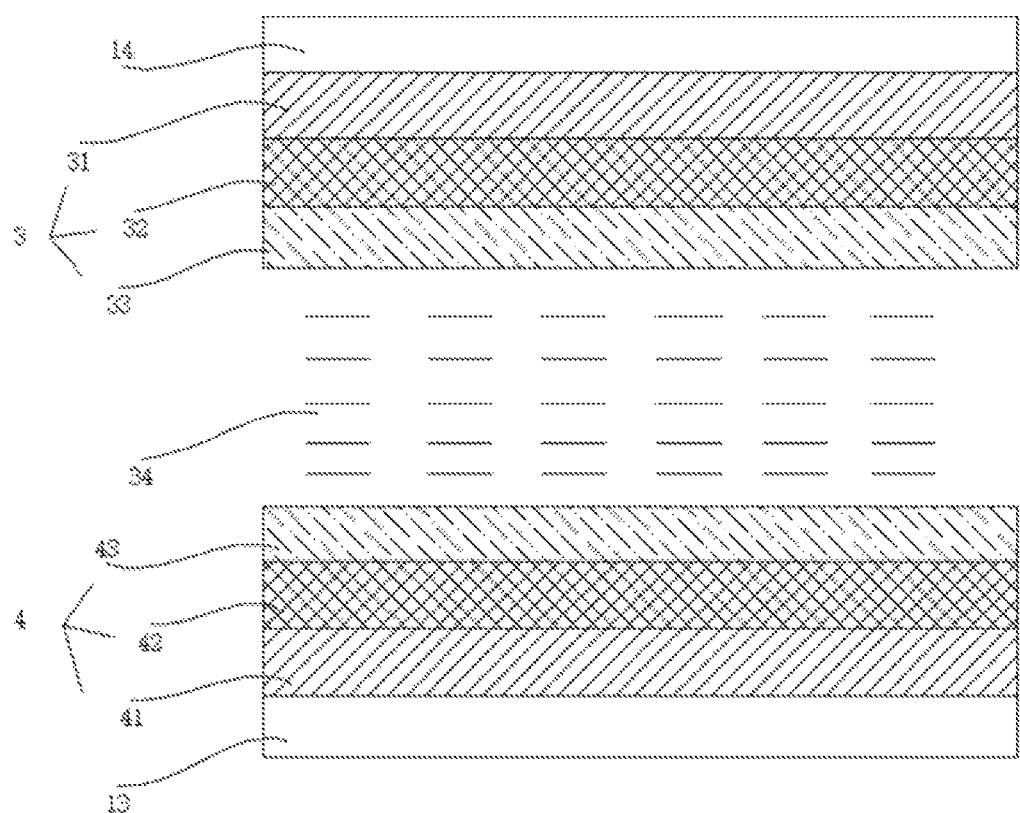
FIG. 5 is a schematic structural diagram of the tint varying film provided with the polarizer and a reflector in Embodiment 2.

In Embodiment 2, a variable tint lens is shown in FIGS. 4 and 5 and includes a layer of the tint varying film and the power supply device 15, wherein the tint varying film includes the first flexible substrate 31, the first conductive film layer 32, the first alignment layer 33, the liquid crystal layer 34, the second alignment layer 42, the second conductive film layer 43, and the second flexible substrate 41 which are successively laminated, and the dichroic dye molecule layer is provided on the liquid crystal layer 34.

This embodiment differs from Embodiment 1 in that a polaroid 14 is provided on a side of the first flexible substrate 31 away from the liquid crystal layer 34; in another embodiment, a reflector 13 is provided on a side of the first flexible substrate 31 away from the liquid crystal layer 34; with the reflector 13, the light transmittance is between 15% and 65%, and with the polarizer 14, the light transmittance is between 5% and 40%. In another embodiment, the polarizer 14 is provided on a side of the first flexible substrate 31 away from the liquid crystal layer 34, and the reflector 13 is provided on a side of the second flexible substrate 41 away from the liquid crystal layer 34; alternatively, the polarizer 14 is provided on a side of both the first flexible substrate 31 and the second flexible substrate 41 away from the liquid crystal layer 34, so that the lens can be adjusted to have different transmittances.

Figure 6:
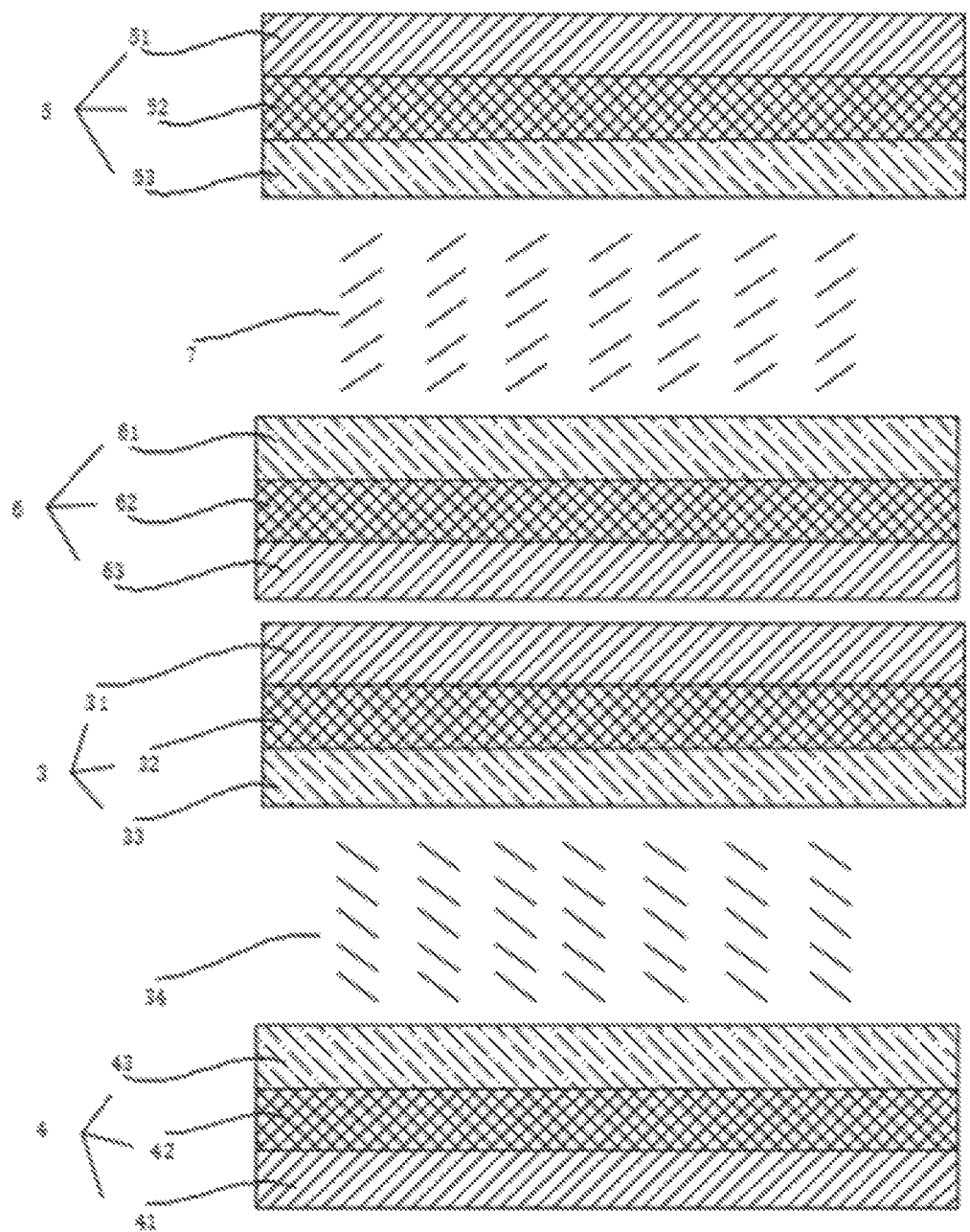
FIG. 6 is a schematic structural diagram of the tint varying film in Embodiment 3.

In Embodiment 3, a variable tint lens is shown in FIG. 6 and includes the power supply device 15 and two layers of the tint varying films which are laminated, namely, including a first substrate layer 3, the liquid crystal layer 34, a second substrate layer 4, a third substrate layer 5, a second liquid crystal layer 34, and a fourth substrate layer 6 which are successively laminated, wherein, when powered on, both the liquid crystal layer 34 and the second liquid crystal layer 34 have a parallel arrangement, and the dichroic dye molecules absorb light and are in a dark state; when not powered on, the liquid crystal molecules 1 of the liquid crystal layer 34 and the second liquid crystal layer 34 are in a perpendicular arrangement, the dichroic dye molecules absorb only a small amount of light and are in a transparent state; the light transmittance in this embodiment can be 5% to 70%.

The third substrate layer 5 includes a third flexible substrate 51, a third conductive film layer 52, and a third alignment layer 53 which are arranged outside the second substrate layer 4 and laminated. The fourth substrate layer 6 includes a fourth conductive layer 61, a fourth alignment layer 62, and a fourth flexible substrate 63 which are laminated on the second liquid crystal layer 34.

The directions in which the first alignment layer 33 and the second alignment layer 42 align the molecules are parallel, and they are opposite to the direction in which the liquid crystal molecules 1 are aligned in the liquid crystal layer 34; the directions in which the third alignment layer 53 and the fourth alignment layer 62 align the molecules are parallel, and they are opposite to the direction in which the liquid crystal molecules 1 are aligned in the second liquid crystal layer 34.

When the third substrate layer 5 is configured in a laminated manner, the direction in which the third and fourth alignment layers 62 align the molecules are perpendicular to the direction in which the first and second alignment layers 42 align the molecules. The liquid crystal molecules 1 and the dye molecules in the liquid crystal layer 34 have an oblique angle with the direction perpendicular to the first alignment layer 33 (the same for the liquid crystal molecules 1 in the second liquid crystal layer 34), but the oblique direction of the liquid crystal molecules 1 in the liquid crystal layer 34 is spatially different from that of the liquid crystal molecules 1 in the second liquid crystal layer 34. The range of light transmittance increases after the light passes through the first liquid crystal layer 34 and the second liquid crystal layer 34, and the range of light transmittance is 5% to 70%.

In another embodiment, the polarizer 14 or the reflector 13 is provided outside the first substrate layer 3 so that the range of light transmittance can be further improved.

In this embodiment, the dichroic dye molecule layers contained in the two layers of laminated tint varying films may both be transparent and tintless; alternatively, each may be in a distinct tint, and a more colorful tint conversion may be achieved by changing the depth of each tint.

Figure 7:
FIG. 7 is a schematic structural diagram of the tint varying film in Embodiment 4.

In Embodiment 4, a variable tint lens is shown in FIG. 7 and includes at least one layer of the tint varying film and the power supply device 15, and if there are a plurality of layers of the tint varying films, the plurality of the tint varying films has at least one layer of the tint varying film that has a dichroic dye molecule layer in a different tint from the dichroic dye molecule layer of other tint varying films.

Alternatively, a lamination of the tint varying films has at least three layers, of which at least one layer of the tint varying film has a red dichroic dye molecule layer, at least one layer of the tint varying film has a green dichroic dye molecule layer, and at least one layer of the tint varying film has a blue dichroic dye molecule layer.

This embodiment differs from Embodiment 1 in that the lens includes the power supply device 15 and three layers of the tint varying films which are laminated, and the dichroic dye molecule layers of the three layers of the tint varying films are red, green, and blue, respectively; as such, with the transmittance of each layer of the tint varying film controlled, a colorful tint change can be seen because of the synergy among the layers, basically covering most of the possible changes in tint, and satisfying the needs of consumers considerably.

In Embodiment 5, a variable tint lens includes the tint varying film and the power supply device 15, wherein the tint varying film can be a single-layer structure in Embodiment 1 or Embodiment 2, a double-layer structure in Embodiment 3, or a three-layer structure in Embodiment 4, and at least one layer of the tint varying film is divided into a plurality of tint regions, the dichroic dye molecule layer shows identical or different tints corresponding to the plurality of tint regions, and the power supply device 15 supplies power to each tint region separately.

If the dichroic dye molecule layer, in a tint region, has a different tint from any other tint region, and the conductive layer is etched to form electrodes that are connected to each color area, respectively, so that the power supply device 15 can supply power to the liquid crystal layer 34 in each color region separately. The tint regions may be patterns, texts, etc. As such, different regions of the lens can display different tints; moreover, the tint, either bright or dark, of each tint region can be adjusted by controlling the output voltage of the power supply device 15.

Figure 8:
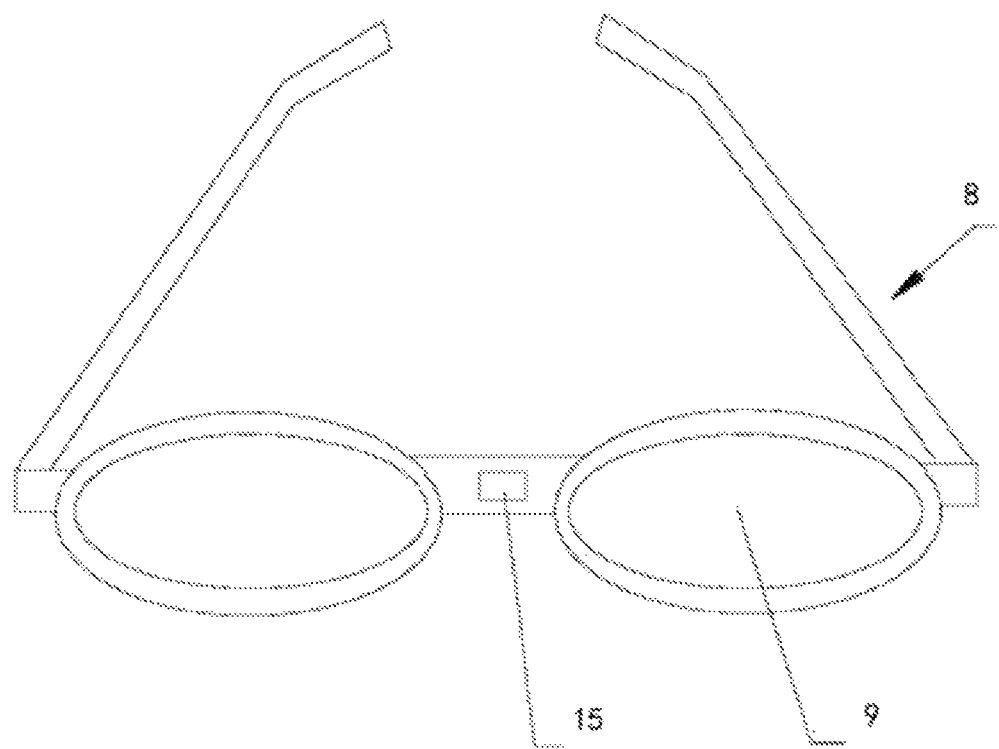
FIG. 8 is a schematic structural diagram of eyeglasses in Embodiment 6.

In Embodiment 6, eyeglasses shown in FIG. 8 include a frame 8 and a pair of lenses, the lens including three layers of the tint varying films which are laminated, and the power supply device 15 mounted on the frame 8 for supplying power to each layer of the tint varying films.

Each layer of the tint varying films includes the first flexible substrate 31, the first conductive film layer 32, the first alignment layer 33, the liquid crystal layer 34, the second alignment layer 42, the second conductive film layer 43, and the second flexible substrate 41 which are successively laminated, and the dichroic dye molecule layer is provided on the liquid crystal layer 34. The materials of the first flexible substrate 31 and the second flexible substrate 41 are PI, the materials of the first conductive film layer 32 and the second conductive film layer 43 are both ITO, and the materials of the first alignment layer 33 and the second alignment layer 42 are both PI. The layers may be adhesively bonded with an OCA (Optically Clear Adhesive).

The power supply device is one of an infrared power supply device 15, a solar power supply device 15, and a USB rechargeable battery, and electrically connected to the first conductive film layer 32 and the second conductive film layer 43, respectively; when turned on, the power supply device can power on the first conductive film layer 32 and the second conductive film layer 43 to form an electrode, thereby affecting the liquid crystal layer 34 to achieve the effect of changing the distribution of the dichroic dye molecule layer and change the light transmittance of the lens. Specifically, when powered on, the liquid crystal layer 34 has a planar spiral arrangement, and the dichroic dye molecules absorb light and are in a dark state; when not powered on, the liquid crystal molecules 1 of the liquid crystal layer 34 are in a perpendicular arrangement, the dichroic dye molecules absorb only a small amount of light and are in a transparent state.

The dichroic dye molecule layers of the three layers of the tint varying films are red, green, and blue in sequence, and the power supply device 15 is electrically connected to each layer of the tint varying films, respectively, so a voltage change can vary the tint and tint depth of the corresponding tint varying film, thereby achieving the effect of adjusting the transmittance and tint of the lens of the eyeglasses.

Furthermore, in this embodiment, if the power supply device 15 is the infrared power supply device 15 or a solar photovoltaic battery, the infrared power supply device 15 can be mounted and hidden in the frame 8, and the infrared power supply device 15 can automatically convert to generate a driving voltage of a corresponding intensity by sensing the intensity of infrared rays, hence the tint or transparency of a shell of the frame can be automatically adjusted, which is energy-saving, convenient, and artistic. The infrared power supply device 15 can be an infrared wide-spectrum (800 nm to 2000 nm) thermo-photovoltaic battery, and such a photovoltaic battery can take indium arsenide or gallium antimonide as a base material to convert the energy of heat radiation directly into electric energy through a semiconductor P-N junction, that is, to produce a photovoltaic effect with the semiconductor P-N junction placed under the irradiation of near-infrared light. This is theoretically similar to conventional solar cells, with the difference in the light source. Solar cells use sunlight or visible light (400 nm to 800 nm), whereas the thermo-photovoltaic battery uses infrared radiation (800 nm to 2000 nm). Relevant descriptions can be seen in many papers and invention patents in China and abroad, which will not be repeated here. Another advantage of such a photovoltaic battery is that the conversion into electrical energy is possible without direct exposure to infrared light, therefore, the photovoltaic battery can be hidden inside the frame 8 without affecting the aesthetics of the eyeglasses.

In the case of strong sunlight or infrared light, the solar cells or the infrared power supply device 15 can convert the infrared light into a direct current voltage, and through the drive module, the direct current is converted into an alternating current to drive the liquid crystal lens. In general, the liquid crystal layer 34 can be driven at only a voltage of 1V to 3V, and the current has only to be microampere, so high safety is ensured; stronger light can produce a greater voltage, and then the tint of the liquid crystal lens gets deeper. That is, when the power supply device 15 does not supply power (sunlight or infrared rays are not strong enough), the lens of the eyeglasses is in a transparent state, and when the sunlight or infrared rays are strong enough, the lens turns dark.

Obviously, in another embodiment, the power supply device 15 may be a lithium battery such as a USB rechargeable battery or a wireless rechargeable battery, which is disposed in the frame 8 and electrically connected to the lens.

Moreover, in another embodiment, three buttons are further provided on the frame 8, that is, a power-off button that can power off the lens and turn it into a transparent state, a voltage-up button that can reduce the transparency of the lens or change the tint of the lens, and a voltage-down button that can increase the transparency of the lens or change the tint of the lens.

The above-mentioned buttons may be a physical structure button, a touch control virtual button, or a sound control signal button, hence two modes of control, namely, manual adjustment or automatic adjustment, are enabled.

In another embodiment, the lens of the eyeglasses can also be any of the lenses described in Embodiments 1 to 5.

Finally, the process of manufacturing the lens mentioned in the various embodiments above is as follows.

(1) Preparation of a liquid crystal: dichroic dyes and a small amount of chiral agent are added to a negative liquid crystal (or a positive liquid crystal), and the mixture is heated to 100° C. using magnetic stirring, stirred for 30 min, and cooled naturally. The dichroic dyes are commercially available through Alibaba.com. The dichroic dyes are 0.1%-5% of the liquid crystal by weight, and the chiral agent is 0.1%-5% of the liquid crystal by weight. A ratio of the dyed and the chiral agent added to the liquid crystal can be appropriately controlled according to the required tint depth of the lens.

(2) Preparation of an empty flexible liquid crystal cell: an electrode mask plate is coated on a flexible ITO thin film (an ITO conductive film layer+a flexible substrate), and then the intermediate product is subjected to an exposure treatment, a developing treatment, an etching treatment, coating of a PI alignment layer, a spraying treatment, silk-screen printing and sealant framing, cell forming, and a cutting treatment, to obtain an empty flexible liquid crystal cell in the shape of eyeglasses.

(3) With a vacuum pressure difference, according to the capillary effect, the liquid crystal in step (1) is infused into the empty flexible liquid crystal cell in step (2) to obtain the lenses.

After obtaining the lenses, the electrodes of the lens are connected to a PCB board of the drive module of the power supply device 15 by using a flexible circuit board and a conductive adhesive to obtain the dimmable eyeglasses.

The eyeglasses may be those commonly used in everyday life, or special ones prepared for use in different environments, such as snow eyeglasses and goggles.

The above-mentioned description is merely preferred embodiments of the present invention and is not intended to limit the present invention. Any modifications, equivalents, combinations, and improvements made within the spirit and principles of the present invention shall fall within the scope of the present invention.

What is claimed is:

1. A chromism light-adjusting lens, comprising:
   a plurality of chromism films, each of the chromism films comprising a first substrate layer and a second substrate layer that are transparent, and a liquid crystal layer disposed between the first substrate layer and the second substrate layer; and
   a power supply device for supplying power to the each of the chromism films,
   wherein the each of the chromism films further comprises a dichroic dye molecule layer, each of dichroic dye molecules of the dichroic dye molecule layer being disposed on a surface of one of liquid crystal molecules of the liquid crystal layer, and a direction in which the liquid crystal molecules are arranged is adjustable with a voltage applied to the each of the chromism films by the power supply device;
   the first substrate layer comprises a first flexible substrate, a first conductive film layer and a first alignment layer which are laminated;
   the second substrate layer comprises a second flexible substrate, a second conductive film layer and a second alignment layer which are laminated;
   the power supply device is electrically connected to the first conductive film layer and the second conductive film layer;
   the liquid crystal layer is sandwiched between the first alignment layer and the second alignment layer; and
   the first alignment layer and the second alignment layer of the each of the chromism films are configured to align the liquid crystal molecules of the each of the chromism films in a first direction, and the first alignment layer and the second alignment layer of one of the chromism films adjacent to the each of the chromism films are configured to align the liquid crystal molecules of the one of the chromism films in a second direction perpendicular to the first direction.

2. The chromism light-adjusting lens according to claim 1, wherein the dichroic dye molecule layer of at least one of the chromism films differs in color from the dichroic dye molecule layer of any other one of the chromism films.

3. The chromism light-adjusting lens according to claim 2, wherein the chromism films comprise at least three chromism films which are laminated, the dichroic dye molecule layer of at least one of the chromism films has a red color, the dichroic dye molecule layer of at least one of the chromism films has a green color, and the dichroic dye molecule layer of at least one of the chromism films has a blue color.

4. The chromism light-adjusting lens according to claim 1, wherein a polarizer/reflector is provided on a side of the first flexible substrate and/or the second flexible substrate away from the liquid crystal layer.

5. The chromism light-adjusting lens according to claim 1, wherein the each of the chromism films has a plurality of color regions corresponding to respective parts of the dichroic dye molecule layer, and the power supply device is configured to supply power to the color regions separately.

6. The chromism light-adjusting lens according to claim 1, wherein the power supply device is an infrared power supply device.

7. The chromism light-adjusting lens according to claim 1, wherein the power supply device comprises a solar cell and a drive module for converting a direct current to an alternating current, the solar cell is electrically connected to the drive module, and the chromism light-adjusting lens further comprises an electrode electrically connected to the drive module.

8. The chromism light-adjusting lens according to claim 1, wherein the power supply device is a wired/wireless rechargeable battery.

9. The chromism light-adjusting lens according to claim 1, wherein each of the first conductive film layer and the second conductive film layer is made from ITO.

10. The chromism light-adjusting lens according to claim 1, wherein each of the first alignment layer and the second alignment layer is made from PI.

11. The chromism light-adjusting lens according to claim 1, wherein each of the first flexible substrate and the second flexible substrate is made from one of PI, PC, PET, COP, COC, and TAC.

12. The chromism light-adjusting lens according to claim 1, wherein the chromism films comprise three chromism films which are laminated, and the dichroic dye molecule layer of each of the three chromism films has one of a red color, a green color and a blue color.

13. Eyeglasses, comprising a frame and a chromism light-adjusting lens, the chromism light-adjusting lens comprising:
   a plurality of chromism films, each of the chromism films comprising a first substrate layer and a second substrate layer that are transparent, and a liquid crystal layer disposed between the first substrate layer and the second substrate layer; and
   a power supply device for supplying power to the each of the chromism films,
   wherein the each of the chromism films further comprises a dichroic dye molecule layer, each of dichroic dye molecules of the dichroic dye molecule layer being disposed on a surface of one of liquid crystal molecules of the liquid crystal layer, and a direction in which the liquid crystal molecules are arranged is adjustable with a voltage applied to the each of the chromism films by the power supply device;
   the first substrate layer comprises a first flexible substrate, a first conductive film layer and a first alignment layer which are laminated;
   the second substrate layer comprises a second flexible substrate, a second conductive film layer and a second alignment layer which are laminated;
   the power supply device is electrically connected to the first conductive film layer and the second conductive film layer;
   the liquid crystal layer is sandwiched between the first alignment layer and the second alignment layer; and
   the first alignment layer and the second alignment layer of the each of the chromism films are configured to align the liquid crystal molecules of the each of the chromism films in a first direction, and the first alignment layer and the second alignment layer of one of the chromism films adjacent to the each of the chromism films are configured to align the liquid crystal molecules of the one of the chromism films in a second direction perpendicular to the first direction.

14. The eyeglasses according to claim 13, wherein the power supply device is provided with a power-off button, a voltage-up button, and a voltage-down button.

* * * * *